United States Patent
Hayward

(10) Patent No.: US 6,693,516 B1
(45) Date of Patent: Feb. 17, 2004

(54) ELECTRO-MECHANICAL TRANSDUCER SUITABLE FOR TACTILE DISPLAY AND ARTICLE CONVEYANCE

(76) Inventor: Vincent Hayward, 2277 Harvard, Montreal, Quebec (CA), H4A 2W1

( * ) Notice: Subject to any disclaimer, the term of this patent is extended or adjusted under 35 U.S.C. 154(b) by 0 days.

(21) Appl. No.: 09/568,024

(22) Filed: May 10, 2000

(51) Int. Cl.⁷ .................................. H04B 3/36
(52) U.S. Cl. ........................ 340/407.1; 340/825.19; 340/407.2; 434/113; 434/114
(58) Field of Search ................... 340/407.1, 825.19, 340/407.2, 965; 345/103; 434/112, 113, 114; 341/20, 21, 27, 22, 34

(56) References Cited

U.S. PATENT DOCUMENTS

| | | | | |
|---|---|---|---|---|
| 4,833,776 A | * | 5/1989 | Wakamiya et al. ........... | 29/837 |
| 5,449,292 A | * | 9/1995 | Tani et al. .................. | 434/114 |
| 5,466,154 A | * | 11/1995 | Thompson .................. | 434/114 |
| 5,467,975 A | | 11/1995 | Hadimioglu et al. ....... | 271/267 |
| 5,489,812 A | | 2/1996 | Furuhata et al. ............ | 310/309 |
| 5,580,251 A | | 12/1996 | Gilkes et al. ............... | 434/113 |
| 5,685,721 A | * | 11/1997 | Decker ........................ | 434/114 |
| 5,717,423 A | * | 2/1998 | Parker ........................ | 345/108 |
| 5,810,843 A | * | 9/1998 | Iwasaki et al. ............. | 606/133 |
| 5,979,892 A | | 11/1999 | Smith .......................... | 271/267 |
| 6,022,220 A | * | 2/2000 | Haugen ....................... | 434/112 |

FOREIGN PATENT DOCUMENTS

| JP | 07096016 | 4/1995 |
|---|---|---|
| WO | WO 98 32112 | 7/1998 |

* cited by examiner

Primary Examiner—Benjamin C. Lee
(74) Attorney, Agent, or Firm—David J. French

(57) ABSTRACT

A tactile transducer is able to provide a tactile display or serve as a tactile input sensor. Paired contactors having contactor tips separated by a gap are connected to transducer means (an actuator or sensor). Variations in the gap distance can create a tactile experience through skin stretch, or provide tactile input in sensor mode.

14 Claims, 17 Drawing Sheets

ELECTRO-MECHANICAL TRANSDUCER SUITABLE FOR TACTILE DISPLAY AND ARTICLE CONVEYANCE

FIELD OF THE INVENTION

This invention relates to an electro-mechanical transducer for tactile stimulation and for tactile sensing. The invention as a tactile display or sensor is suited for use as a computer peripheral or any device requiring the presentation or reception of tactile sensations to or by a user including rehabilitation treatments. Specific embodiments also have applications as a micro-actuator for conveying objects.

BACKGROUND TO THE INVENTION

Devices have been built in the past to relay tactile information to a subject by mechanical stimulation distributed over a significant area of the skin, usually at the fingertip pad. Such display devices have almost exclusively relied on actuated arrays of raised pins called hereafter "indentation" devices. For example in U.S. Pat. No. 4,871,992, Petersen discloses an apparatus which combines electromagnetic transducers and cam transmissions to raise and lower pins under computer control.

Other modes of actuation have been applied to accomplish similar purposes. In U.S. Pat. No. 5,580,251, Gilkes and Cowens describe the application of polar organic gels to create computer controllable raised dots patterns. In U.S. Pat. No. 5,222,895, Fricke discloses a method to use electrorheological fluids to cause raised dots to appear on a flexible surface. A similar arrangement appears in U.S. Pat. No. 5,496,174, Garner.

Piezo ceramics have also shown great utility in achieving similar purposes e.g., U.S. Pat. No. 4,044,350 to Tretiakoff and Tretiakoff and U.S. Pat. No. 4,758,165 to Tiesmans and Zeehuisen which combines piezo ceramics with actuating cantilever reeds in a Braille cell.

Electromagnetic means are disclosed in U.S. Pat. No. 4,586,904 to Chlumsky and in U.S. Pat. No. 3,984,708 to Holmlund and Alden, as well as in U.S. Pat. No. 4,191,945 to Hannen and Charlesworth and in U.S. Pat. No. 5,583,478 to Renzi.

Recently, shape memory alloy actuators have attracted attention for similar purposes, as in U.S. Pat. No. 5,165,897 by Johnson, U.S. Pat. No. 5,685,721 by Decker, and U.S. Pat. No. 5,718,588 by Tretiakoff and Tretiakoff.

These indentation devices create sufficiently loud tactile sensations for relatively large amounts of indentation. A common design specification for such prior art devices is that they provide a quasi-static indenting displacement of the order of one millimetre of vertical displacement.

Another type of display takes advantage of vibrotactile stimulation. With this technique, an array of tactile active sites stimulates a portion of the skin using an array of contactors vibrating at a fixed frequency. This frequency is selected so as to maximize the loudness of the sensation (200–300 Hz). Tactile images are associated, not with the quasi-static depth of indentation, but the amplitude of the vibration. The Optacon™ device is one of the most well know example. Such units, however, also, rely upon indentation to provide a tactile sensation.

Finally a somewhat different principle is disclosed by Asano et al U.S. Pat. No. 5,389,849 to display tactile information by causing standing and traveling waves in a medium. Nevertheless, the medium itself is displaced vertically and provides an indentation stimulation, albeit a laterally displacing indentation stimulation.

To date, most tactile displays rely on skin indentation effected by a collection of controllable raised pins, hence the term shape displays. Thus static indentation is used as the most common mechanism to create tactile displays.

As referenced earlier, a further kind of tactile sensation can be provided, often referred to as "vibrotactile". When a contactor applies a vibratory signal to the skin at a frequency, which may range from a few Hertz to a few kilohertz, a perception is derived which may be described as "buzzing". Under certain conditions, a dense collection of vibrotactile stimulation sites may provide the sensation of a tactile image. This is principle on which vibrotactile displays operate. Vibrotactile stimulation may also be of impulsive nature.

Nearly all previous tactile display devices to date have relied on skin indentation as opposed to skin stretch to effect sensations. This present invention relies upon the lateral displacement of the skin to create tactile sensations either of shape type or of vibrotactile type. This allows new forms of transducers of convenient size and structure to be employed.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to one aspect of the invention a basic electro-mechanical transducer is provided which comprises in one optional simple form, at least one contactor having a contacting tip which is coupled to an associated transducer which serves as a sensor or actuation means to sense or effect lateral displacement of the contacting tip. With a sensate contacted object positioned at the contacting tip of the contactor, lateral displacement of the contacting tip by the contact actuation means will produce a tactile sensation on the sensate object. The effect of the invention is to provide a tactile sensation through the imposition of a stretching or compressing force on the skin (hereafter "skin stretch"). Thus tactile sensations are effected through a lateral displacement of portions of the skin or surface of the sensing object.

Preferably, two or more contactors are provided, particularly for tactile stimulators. Tactile display may be limited to a single location stimulated by a pair of contactors or may be provided by a tactile array: a packed array with the individual contactors being driven by a corresponding array of contactor actuators—a driving array. By providing for discrete control over individual actuators in the driving array, a variety of motions for various contactors can be provided, resulting in elaborate tactile sensations.

The contacting tips of an array of contactors may be presented in planar alignment or may be shaped in other than a planar alignment. When supported by a pre-formed substrate, these tips may conform to a shape that is ergometrically efficient or which enhances the coupling of the tips with the contacting object, usually the finger pad.

Contactors may be connected to actuators or sensors by couplings which mechanically amplify the displacements produced by the actuators or delivered to the sensors. A variety of devices may be employed as motive sources, including piezo-electric actuators, magnetostrictive actuators, electrostatic actuators, electroactive contractile or electrostriction polymers actuators (e.g. in electron irradiated P(VDF-TrFE) copolymers), heat expansion actuators, variable magnetic reluctance actuators, Lorentz effect actuators, fluid based actuators using cylinders or bladders, and other equivalently acting actuators. Recent developments in thin-film (sol-gel) piezo-electric devices which allow low voltage operation at, e.g. 5–20 volts, are particularly suited for use with the invention. The actuators may provide displacements in any direction so long as these are converted to lateral motion at the contacting tips of the skin contactors.

Many of the same elements will also serve as sensors.

The invention is equally effective at providing for tactile sensing arrays since most actuators can operates as a two way transducer and can be applied as part of a tactile sensing array. By insertion of appropriate filters between the sensing array and the display array selected features of the tactile signal may be enhanced: a tactile microscope so-to-speak.

Thus, the invention in one aspect provides a tactile transducer comprising at least one pair of adjacent contactors, each contactor having a contacting tip separated by a gap from the adjacent contacting tip, said contactor pair being coupled to transducer means to effect or sense relative displacement of said contactors and associated variation of the lateral gap distance between said contacting tips.

The transducer may be in the form of a linear array of transducers wherein multiple transducers define a sequence of gap distances between consecutive contactor tips, said contactor pairs being coupled to a multiple number of transducer means to effect or sense the variations in the inter-tip gap distances in said sequence of gap distances.

Optionally, adjacent contactors are coupled to individual, shared transducer means.

The invention may also be in the form of a transducer interspersed sets of linear transducer arrays defining an area array which includes gap areas, each gap area being surrounded by contactor tips, said contactors being coupled to said transducer means to effect or sense variations of gap areas.

A particular area array incorporates three interspersed sets of linear transducer arrays defining an array of gap areas surrounded by triplets of contactor tips carried by respective contactors, each triplet of contactors being coupled to transducer means to effect or sense variations of gap areas.

Advantageously, contactors may be mounted to associated transducer means so as to mechanically amplify the effect of the lateral displacement of the contactor tips on the transducer means. Further the gap, the gap distances, or the gap areas between contactor tips may be occupied by flexible, resilient, elastic material.

Preferably, the transducer means operate on the basis of a piezo-electric effect.

The invention also provides a method of creating a tactile display across a plurality of contactors, each contactor having respective contactor tips separated by gaps that are actuable by actuation means, comprising operation of the actuation means to cause the contactor to be laterally displaced in relation to one another, placing a sensate object against said contactor tips to create tactile sensations. such tactile sensations being caused by varying gap distance or the gap distances, or the gap areas between the contactor tips.

In this method as in claim 9 wherein the contactor tips may be actuable by shared actuation means. Further, the gaps may be varied in size as a result of amplified transverse movements of the contactor tips in response to longitudinal movement of the actuation means.

The foregoing summarizes the principal features of the invention and some of its optional aspects. The invention may be further understood by the description of the preferred embodiments, in conjunction with the drawings, which now follow.

BRIEF DESCRIPTION OF THE DRAWINGS

FIG. 2EE is a detail of a variant of FIG. 2E with the transducer flexibly mounted to the platform.

DESCRIPTION OF THE PREFERRED EMBODIMENTS

The invention disclosed here relies on a different principle from that of indentation stimulation to create tactile displays, being the stimulation of the skin through surface strain patterns. To illustrate this, the reader may perform a simple experiment with the aid of an ordinary plastic comb 100.

Figure 1:
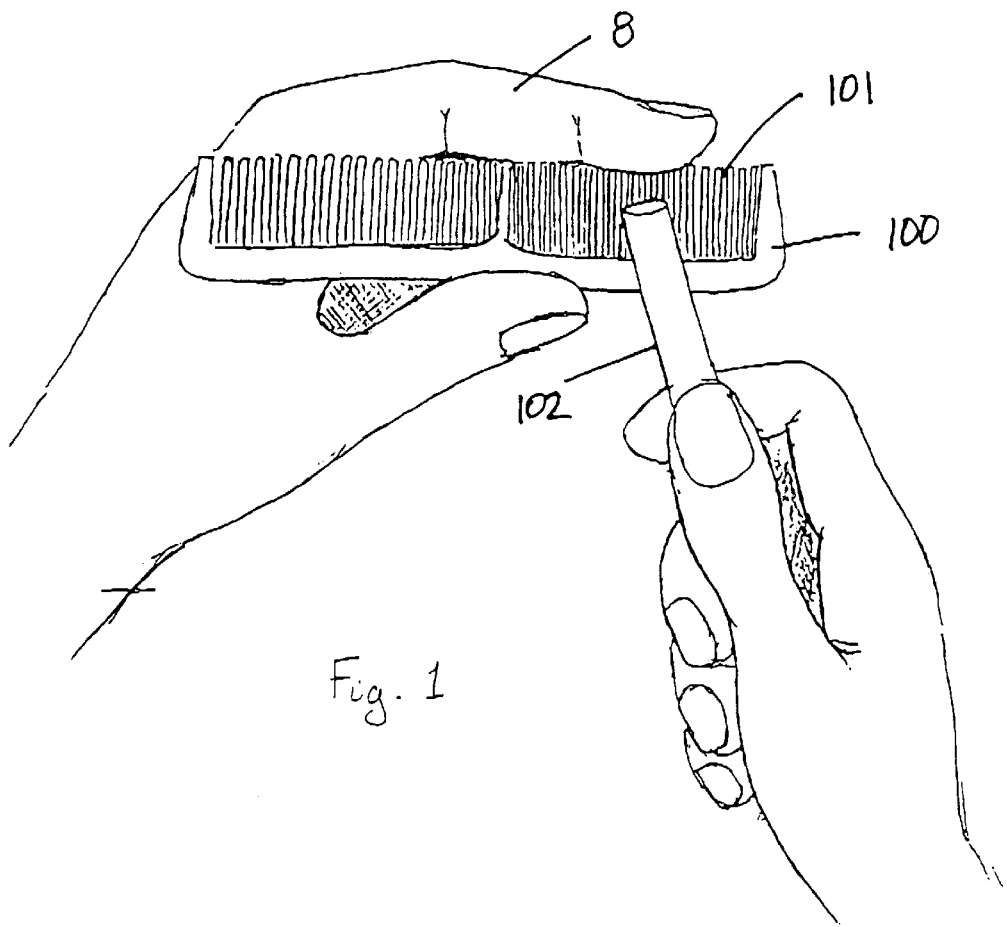
FIG. 1 is a pictorial representation of tactile stimulation created by lateral displacement of the teeth on a comb.

The comb 100 is held so that the line of fine pitched teeth 101 contacts the tip of the index finger 8 along its length, as in FIG. 1. At rest, the individual teeth 101 cannot be sensorally distinguished apart, creating the sensation of a continuous edge. When the teeth 101 are stroked gently back and forth at the mid-point of their length, as by a stick or pen 102 held in the other hand, the resulting sensation in the finger 8 is that of an "embossing" running back and forth under the finger 8 even though the finger 8 remains stationary with respect to the comb 100.

The motion of each individual tooth 101 is minuscule, of the order of a few micrometers and yet the resulting sensation is very present and "loud". It is also important to notice that the same experiment performed with the coarse pitched side of the comb 100 is not nearly as convincing.

This experiment demonstrates that the human tactile sensory apparatus can be very sensitive to small displacements of the skin under the condition that the mechanical stimuli cause "skin stretch" that is, surface strain.

Moreover, vibrotactile sensations are equally well provided when the vibrating skin contactors oscillate laterally with respect to the skin as when they oscillate in a normal direction, as well as in any other direction. This is due to the ability of the skin, because of its visco-elastic properties, to track rapid movements in any direction.

Figure 2A:
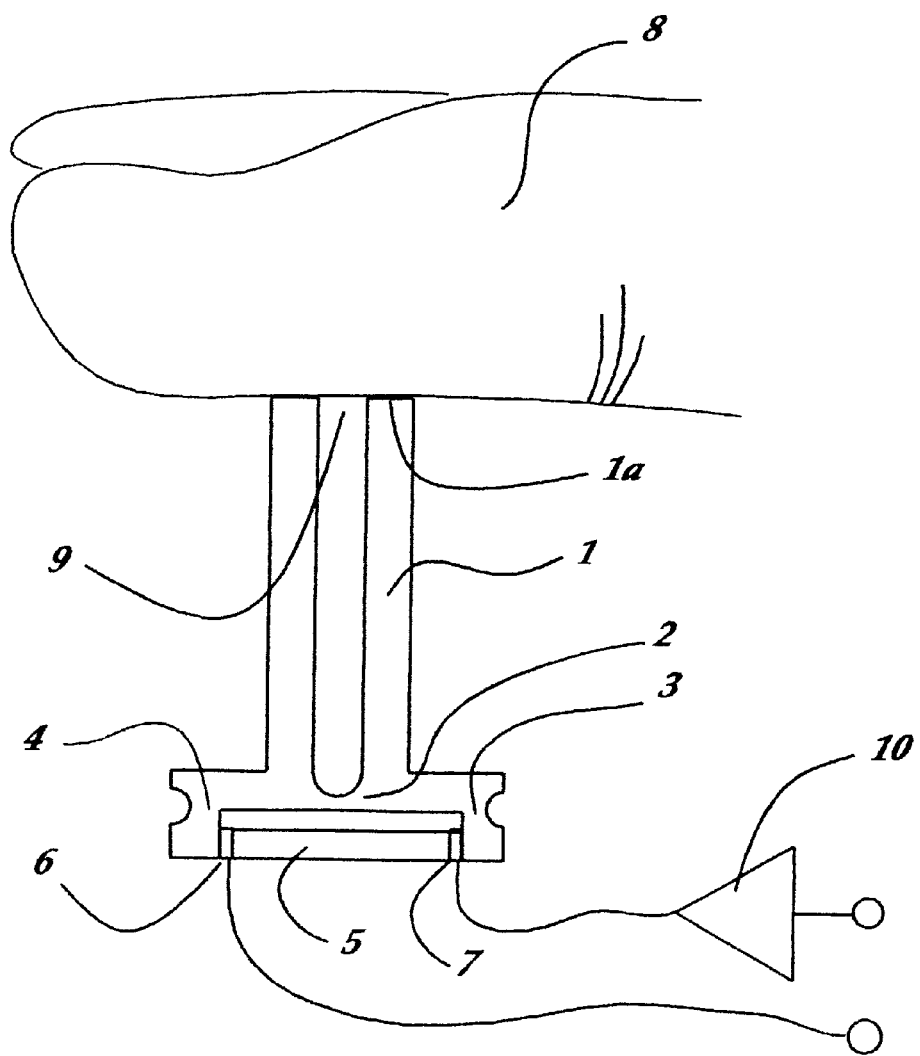
FIG. 2A is a schematic face view of a finger being tactically stimulated by a basic, paired-contactor tactile transducer, according to the invention.

A simple realization of the invention is illustrated in FIG. 2A as an embodiment designed to cause punctuate stimulation. Skin contacting rods 1, held in a tuning fork-like configuration by elastic, thin bridging arc sections 2, 3, 4, are mechanically displaced laterally by the expanding and contracting movements of an actuator 5.

Preferably operating on piezoelectric effect, the actuator is bonded at its ends 6, 7 to the root of the tuning fork-like configuration. The tip extremities 1a of the rods 1 in contact with the skin of finger 8 define a varying gap 9. Displacement of the tips 11 in opposite directions, towards and away from each other, imposes stretch and compression forces on the skin. With the actuator 5 driven by a controlled activation means 10, this mechanism is capable of providing a loud tactile stimulus for a small relative displacement of the contactors, e.g. on the order of a few tens of micrometers. While this device is illustrated using a piezo-ceramic actuator, a variety of actuating devices as referenced above, or other equivalently acting actuators could also be employed.

Figure 2B:
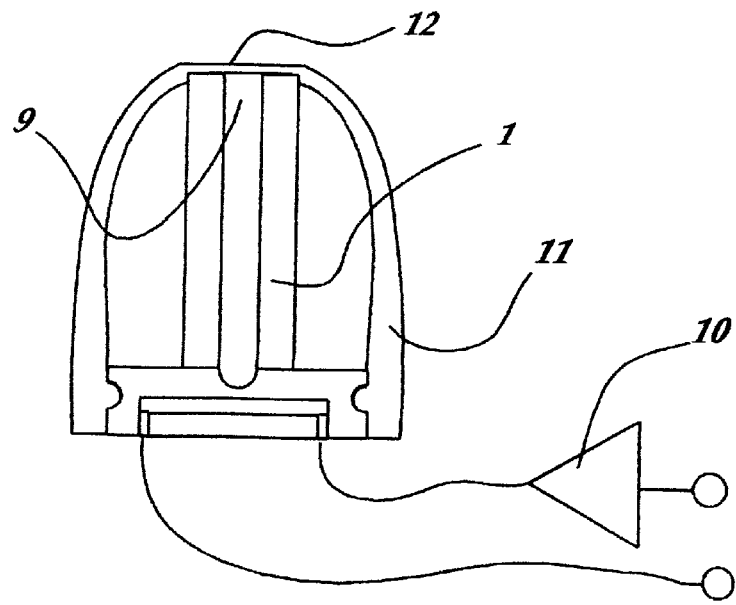
FIG. 2B is a side view of the transducer of FIG. 2A contained within a cross-sectioned, enveloping, outer covering.

In FIG. 2B, the same realization as FIG. 2A is shown encased in a elastomeric protective skin or cover 11 for inclusion in a device intended for contact with human subjects. The portion 12 of the cover 11 bridging the gap 9 may be of thin cross-section and flexible to facilitate the movements of tuning fork-like contactors 1.

Figure 2C:
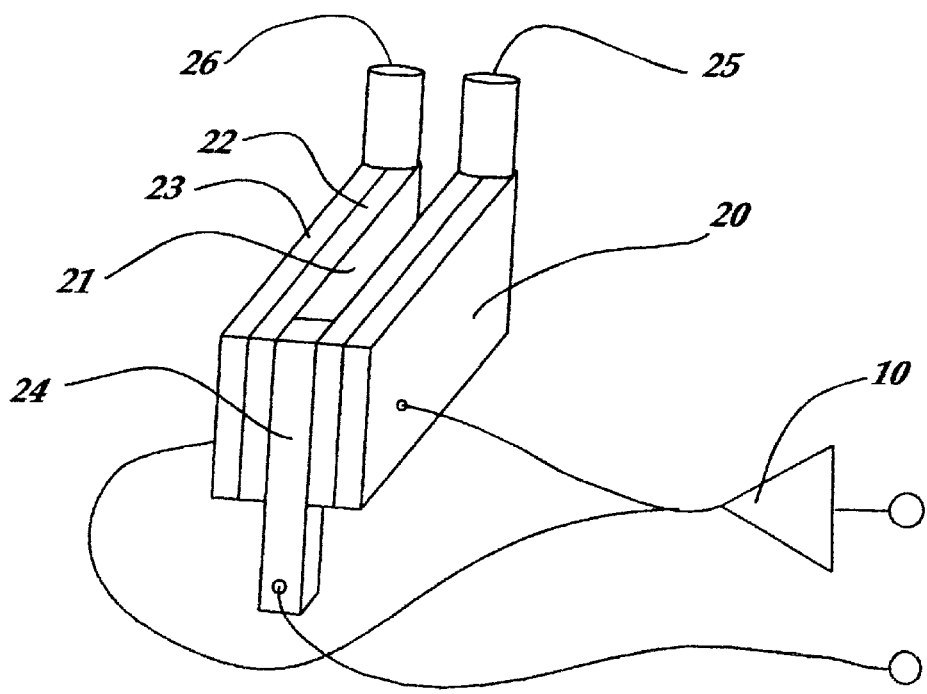
FIG. 2C is an alternate embodiment of a basic tactile transducer employing two bi-morph piezo-electric actuators.

In FIG. 2C, an alternate realization of the invention is shown employing two bimorph piezo-electric actuators 20 and 21. As is well known, bimorph actuators are made of two bonded piezo-electric blades 22 and 23. The actuators are electrically and mechanically coupled by a conductive part 24. Both actuators are electrically activated by a common activation means 10. These actuators upon activation undergo bending deformation. With suitable polarization, the actuators will cause the skin contactors 25 and 26 to move with respect to each other, preferably in opposed directions, thereby causing lateral stretch to skin in contact.

Figure 2D:
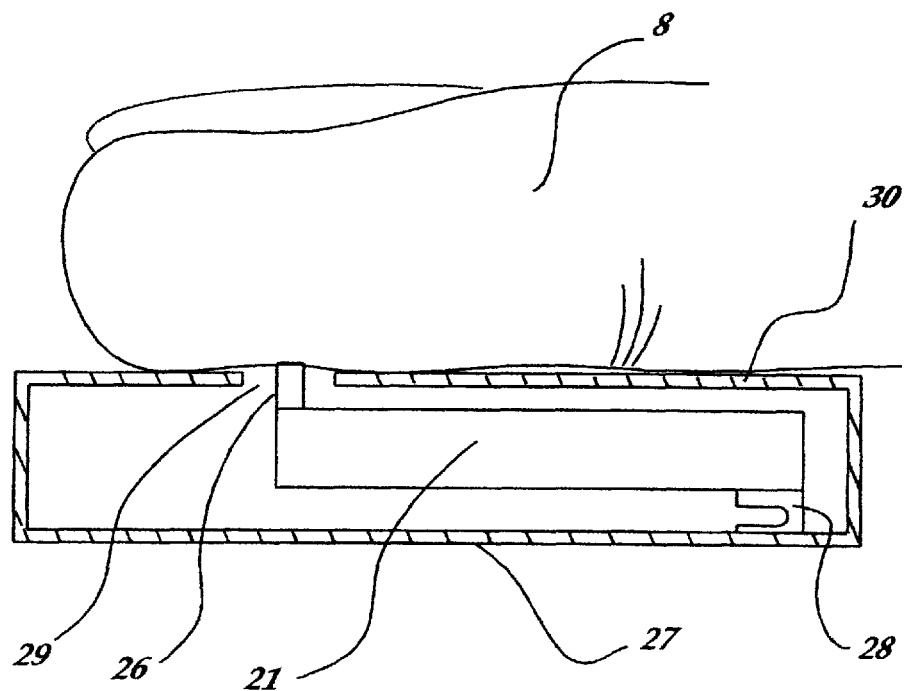
FIG. 2D is a side view of the transducer of FIG. 2C with a spring loading feature within a cross-sectioned enveloping outer covering.

FIG. 2D is a side view of the invention in FIG. 2C. This embodiment can also provide a single-point or "punctual" tactile sensation. While the presence of two skin contactors 25,26 is contemplated in FIG. 2D, the use of only one contactor 26 would still create a tactile sensation, as would also occur in FIG. 2A. However, by using a pair of contactors that have tips which move in opposite directions, a "louder" tactile sensation may be created.

An important feature in the configuration of FIG. 2D is spring 28 designed to cause a bias force, of the order of 0.1 N, to be applied to the skin. This bias spring 28 is depicted as a flexural member, but could be realized in any of many different ways that effectively decouple a substantial portion of the tactile stimulation from the pressure applied by the user.

The use of such force-biasing means 28 may be adapted for all embodiments of the invention disclosed herein, whether it is in a punctuate, line, or surface display.

The protective cover 27 has an aperture 29 to let contactors 26 and 25 protrude slightly from the upper plate 30 on which the finger 8 rests, and to permit contactors 26 and 25 to move freely to effect lateral skin stretch.

Figure 2E:
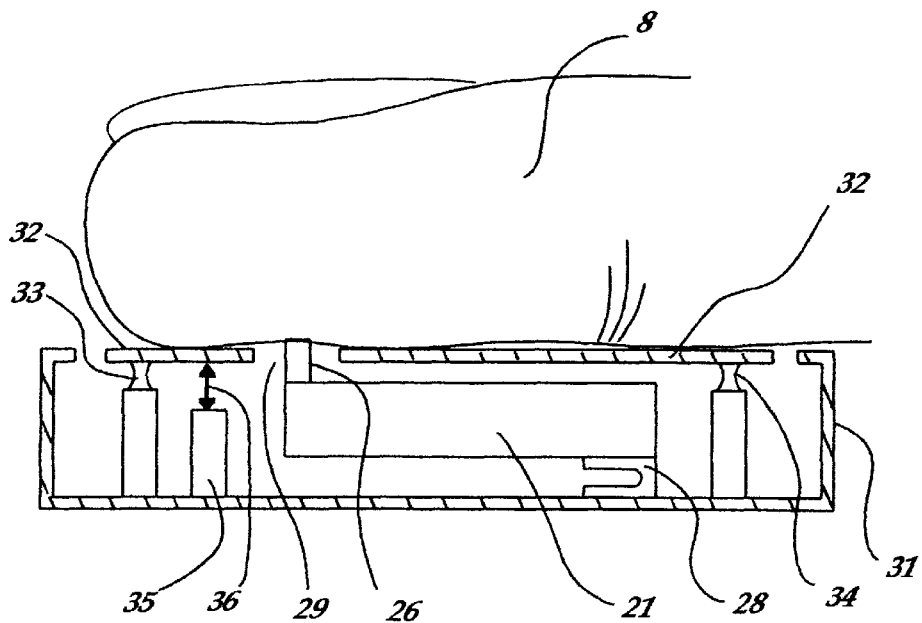
FIG. 2E is a side view of the transducer of FIG. 2D associated with a data input depressible platform.
Figure 2E:
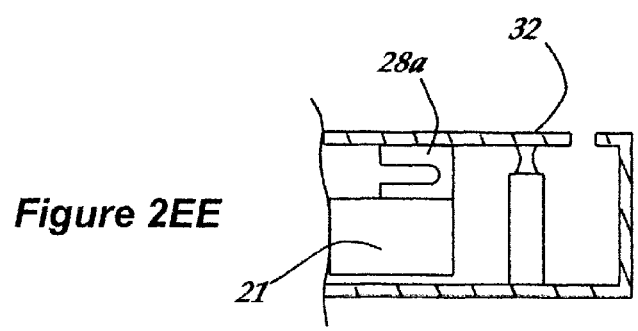

FIG. 2E shows the invention of FIG. 2D with finger 8 in contact with the contactors 26 and 25 (not seen). However the protective cover 27 of FIG. 2D is now in the form of a separate plate. This top plate 32 is coupled to the base 31 of the cover 27 by means of elastic couplings 33 and 34 which permit relative movements of about 1 mm to occur between parts 31 and 32 in response to a user's finger action. The spring or biasing means 28 may be mounted on the base 31 or on the underside of the top plate 32 as an alternate biasing means 28A—see detail FIG. 2EE. Small motions are permitted in all three x, y, z directions. The slight force applied to the finger by contactors 26 and 25 is kept at a substantially constant level by the resilient biasing means 28A. By this arrangement the movement of the contactors 26,25 is not impeded by the small relative movements of the top plate 32.

The small motions of the plate 32, in three directions, are measured by displacement measurement means 35. The relative displacement between the two parts 31 and 32 in the z direction is symbolically represented by the double arrow 36.

Figure 2F:
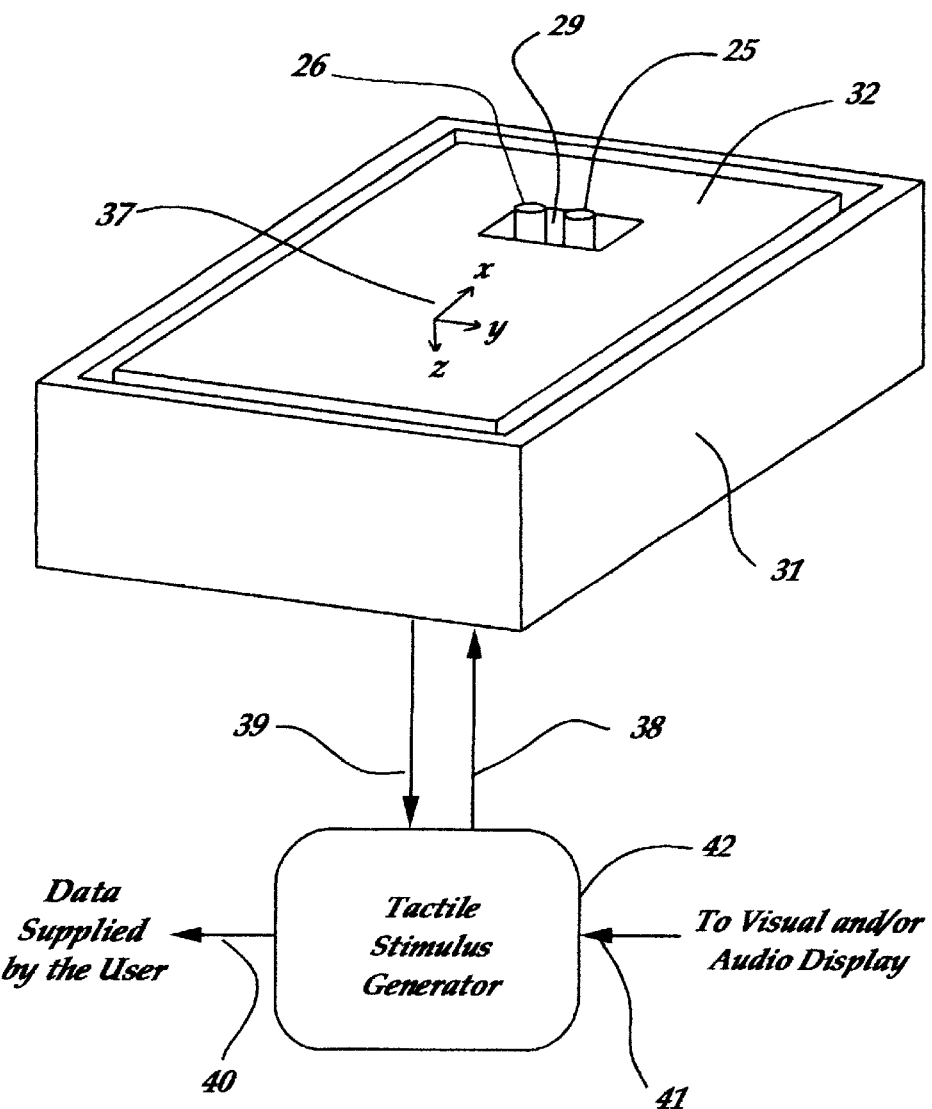
FIG. 2F is pictorial, exterior representational view of the combined input-display device of FIG. 2D.

FIG. 2F shows a perspective view of the invention of FIG. 2E, not showing the user's finger so that aperture 29 and contactors 25 and 26 can be clearly seen. The upper plate 32 is permitted small relative elastic movements in all three directions X, Y, and Z. This is symbolically represented by the coordinate frame 37. The small movements measured by measurement means 35 of FIG. 2E are sent in numerical or analog form via data link 39 to a tactile stimulus generator processor 42 containing a combination of analog, digital, and/or computational circuits. The tactile stimulus generator processor 42 produces signals transmitted over data link 38 in analog or digital form to the tactile display device more fully depicted in FIG. 2E so that tactile stimulation may be experienced by the user as a result of the small movements of plate 31 with respect to case 27.

An example of the manner the tactile stimulus generator may operate is briefly described now. The small movements in the X and Y direction, considered to be signals dependent on time $X'(t)$ and $Y'(t)$, are processed by an substantial approximation of the mathematical operation of integration over time. The small movements in the Z directions are also measured and transduced in a signal $Z(t)$. One example of the use of signal $Z(t)$ is to apply it to modulate the gain of the integrators processing the signals $X'(t)$ and $Y'(t)$ A particularly simple yet useful case is to simply let the gain of the integrators be zero when $Z(t)$ is under a threshold and have some finite value when $Z(t)$ is higher than a larger threshold. Another example of the use of signal $Z(t)$ is to let a user specify an event whenever $Z(t)$ exceeds yet another higher threshold.

The resulting signals $X(t)$ and $Y(t)$ may be considered to represent the position or displacement of a cursor in a space which may be represented tactually, visually and/or audibly. Since in the context of this invention the audio and visual aspects are optional, or even purposefully omitted, these optional aspects are symbolically represented by the data link 41 only. The signal $X(t)$, $Y(t)$, along with $Z(t)$, may then be considered to be data supplied by a user. While being produced, these signals are used to generate tactile stimuli which correspond to different events about the signals $X(t)$, $Y(t)$, and $Z(t)$.

For example a rapid sequences of impulses or "taps" generated by the contactors 25,26 may be felt by the user with a frequency related to the velocity of an invisible cursor. As another example, whenever the cursor crosses predefined boundaries in the space, specific tap sequences originating from the contactors 25,26 may be experienced by the user. Whenever the $Z(t)$ exceeds the event signalling threshold, yet another specific tap sequence may be experienced by the user. Thus the invention can provide a highly versatile interactive tactile display that depends on input from the user.

While an actuator of the form shown in FIG. 2C has been depicted in the FIGS. 2D–2F, a different form of actuator, as for example that of FIG. 2A, may also be employed in this application.

Figure 3A:
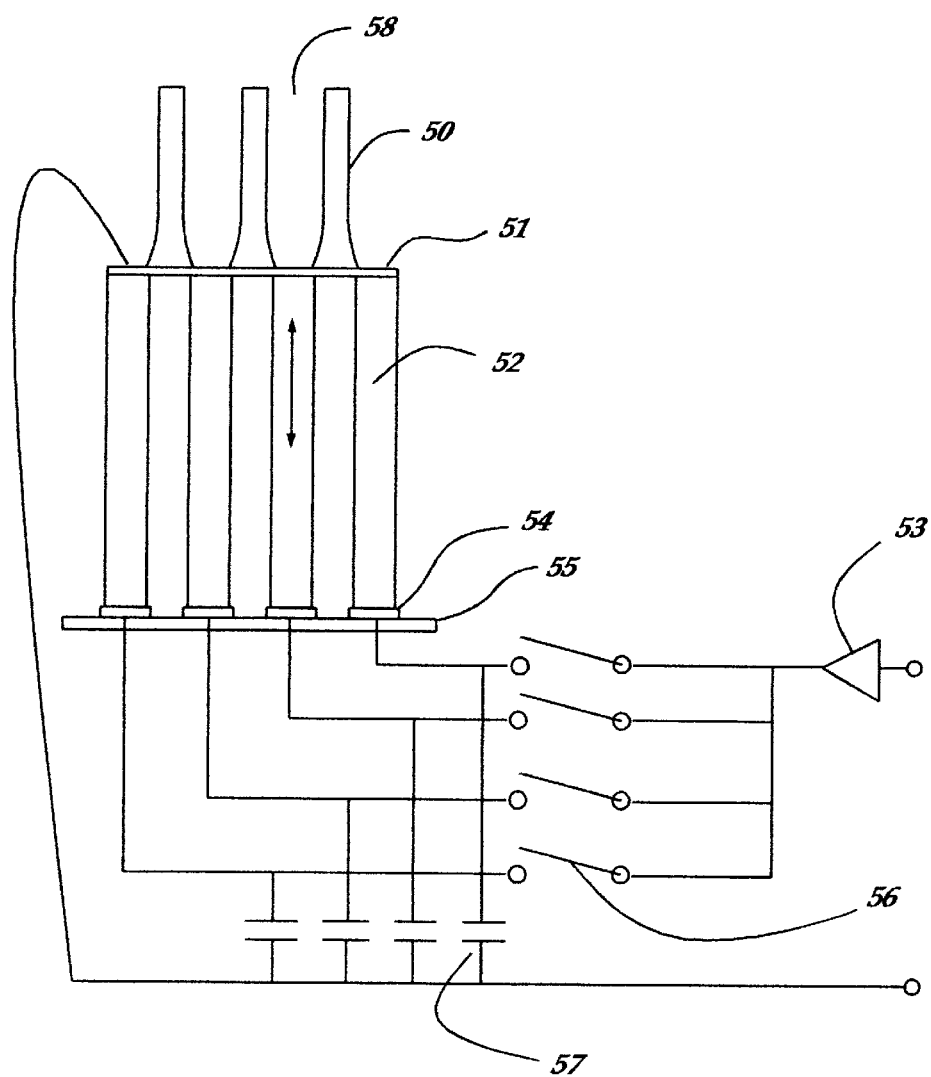
FIG. 3A is a schematic side view of an electro-mechanical transducer incorporating a multiple, linear contactor array and multiple piezo-electric actuators.

A one dimensional or linear array of tactile stimulators according to the invention is showed in FIG. 3A forming a line display. The contactors 50 are made of stiff vertical rods or tubes. They can be made of light metallic alloys or stiff materials such as carbon fiber composites. The diameter of these rods 50 may be of the order of one millimetre. These rods 50 are closely packed so as to be separated from each other by a gap distance comparable to their diameters. Their cross section can be circular, square or of any other convenient shape. They can optionally be swaged at one end with the small end presenting the contacting tip 75 that is in contact with the skin.

These rods 50 may be collectively bonded through a flexible, resilient bonding layer 51 to an array of actuators 52 which also have the shape of rods, optionally of similar size and shape, and which are arranged according to a similar pattern. The bonding layer 51 is preferably electrically conductive to provide a common, electrical ground plane over the ends of the actuators 52.

The piezo-electric actuators 52 operate by extending or contracting in response to signals from activation means 53 using a multiplexing technique further described below. One essential aspect of the invention is the manner in which the actuators 52 cause the movement of the rods 50. It is not essential, in the intended uses of the transducer, to control the movement of each contactor tip individually and apart from its neighbours. Instead each rod may be actuated in relationship to its immediate neighbours so that gap distances may be changed in response to the activation of the actuators. This may be achieved by allowing each actuator 52 to be straddled by at least two rods 50 and therefore influencing at least two contactor tips 75 simultaneously. Optionally, as shown further below more than two rods 50 may be actuated by each actuator 52.

The benefits of these arrangements include improved structural strength in a miniature device, and the ability to take advantage of strain-based actuating effects such as piezoelectric actuation or shape memory alloy actuation through mechanical amplification. Such strain-based actuators typically exhibit small relative strains (less than 0.05% for piezoelectric actuation and less than 8% for present shape memory alloys) and consequently must normally be used in significant lengths. With the arrangement described, close packed actuator arrays may be realized. A preferred method of actuation is by the piezo-electric effect.

More specifically, these actuators 52 may be made of sandwiched piezo-ceramics operating in the d31 mode. Alternatively, they can be realized as stacked piezo-actuators operating in the d11 mode. The d11 mode piezo-electric effect corresponds to creating a field across a slab of piezoelectric material and observing a strain along the same direction. The preferred configuration for the actuators 52 is that their diameters are like that of the contactor rods 50, being typically of the order of one millimetre or less. Electrical activation is effected by applying a difference of electric potential between each end of an actuator 52 so that the contraction and extension of these actuators 52 is preferably of the order of 10 micrometers.

It must be noted that other types of miniature actuators may be considered as referenced above, but piezo-ceramic actuators 52 possess the preferred properties of stiffness and high bandwidth of motion.

The actuators 52 are bonded at their base ends 54 to a third array of electrical pads 72 conveniently realized by means of a printed circuit board 55 so each actuator 52 can be individually activated. A multiplexing technique permits a plurality of actuators 52 to be activated by a single activation means 53. During short consecutive time periods, electronically controlled switches 56 are sequentially and cyclically closed so that activation means 53 may charge individual capacitors 57 designed to maintain a given activation level until they are refreshed at each cycle. With proper signal synchronization, a plurality of inter-contactor gap distances 58 can be controlled at high rate.

Figure 3B:
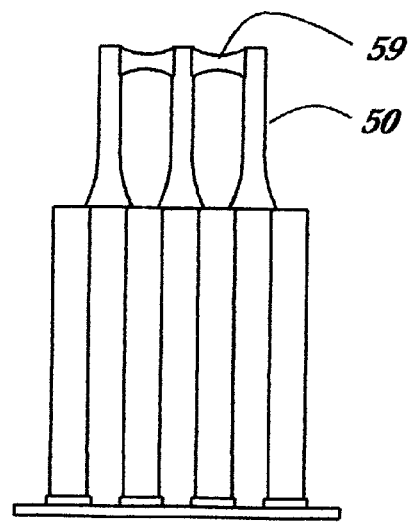
FIG. 3B is a detail side view of the contactors of FIG. 3A incorporating motion-limiting damping and protective elastic blocks.

In FIG. 3B, a similar device is shown with elastomeric material 59 partially filling the inter-contactor gaps 58 at the tip ends of the contactors to provide a continuous surface exposed to the skin and to buffer the displacement of the contactors 50.

Figure 3C:
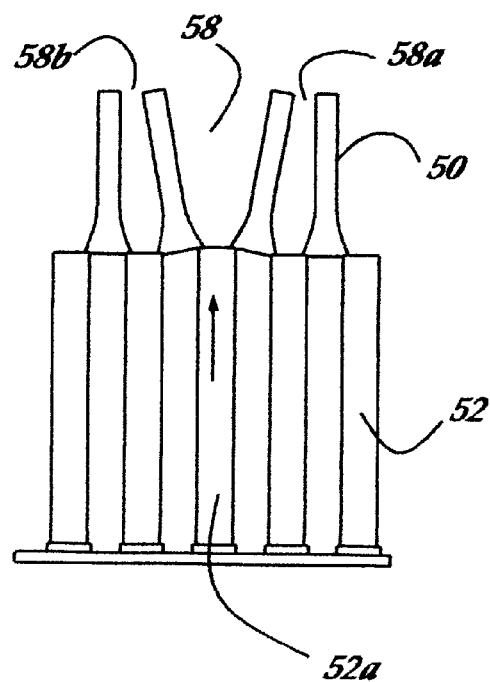
FIG. 3C depicts the effect of the action of one actuator on the position of neighbouring contactors of FIG. 3A.

In FIG. 3C, a similar array of five actuators 52 and four rods 50 is shown in an actuated state. Actuator 52A is activated so as to extend by a small amount while the other actuators 52 are left at their resting length. The effect of the action of one single actuator 52 is to increase gap 58 between the two supported rods 50 by an amount substantially equal to the extension of the actuator 52 amplified by the ratio of the length of the rods over the pitch of the array, while adjacent gaps 58A and 58B decrease by half of this amount respectively. In this example, the average displacement of the tips is zero, but the gap distances 58,58A,58B can be controlled locally.

Figure 3D:
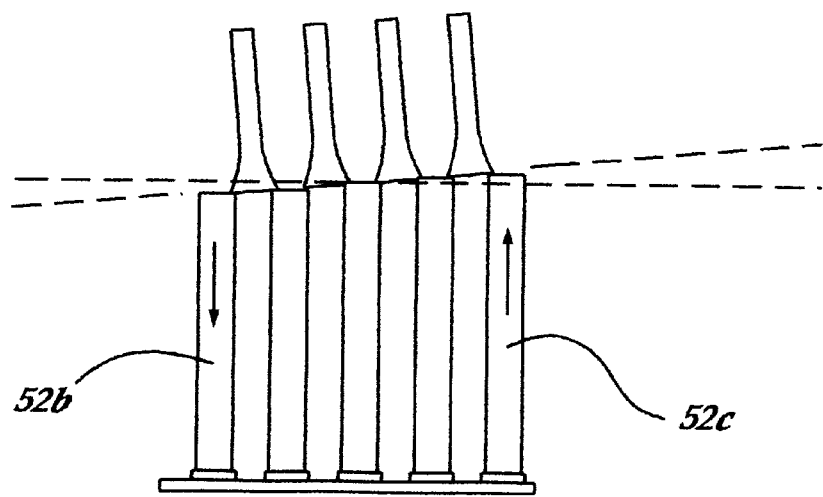
FIG. 3D depicts the effect of a spatially scheduled activation pattern on a set of consecutive actuators of FIG. 3A that are of increasing height.

As a further example, FIG. 3D shows an activation pattern where all the tips are moved in the same direction to the left. This is achieved by shortening the left-most actuator 52C, extending the right-most actuator 52D, and scheduling all the other actuators in between so as to create an incline in the heights of these actuators.

Figure 3E:
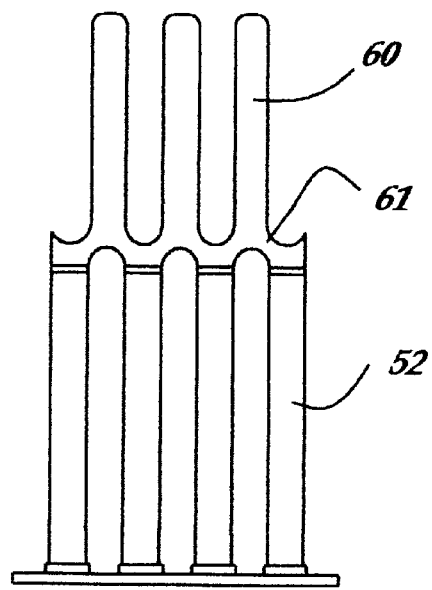
FIG. 3E depicts a mode of construction of an alternate linear array whereby the contactor array is cut out of a single part with flexural sections.

FIG. 3E shows an alternate embodiment of the invention similar to the device depicted in FIG. 3A. A single part 60 is featured to provide for the skin contactors 50 at the top and for bonded connection to the actuators 52 at the bottom. Operation is made possible by flexural crosslinks 61.

Figure 4A:
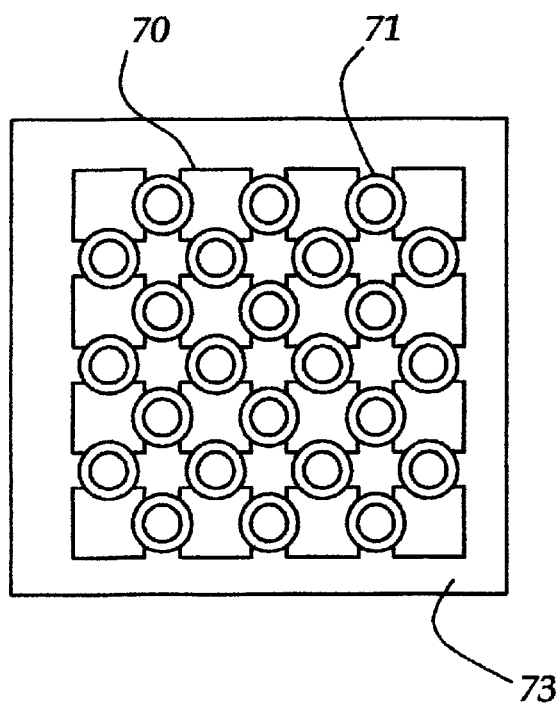
FIG. 4A is a plan view of a surface or area transducer depicting actuators positioned in a square grid to effect lateral x and y displacements of the contactors.

In FIG. 4A, a top view is shown of a two dimensional, surface array of actuators 70 and rods 71 to form a surface display. These elements 70,71 are bonded to each other and are distributed so as to be spatially out of phase by half a spatial period in each horizontal directions. A similar multiplexed activation technique as for FIG. 3A can be used to economically activate the large plurality of actuators 70 of FIG. 4A. The actuators 70 are bonded to pads 72 supported by printed circuit board 73 as further shown on FIG. 5A.

Figure 4B:
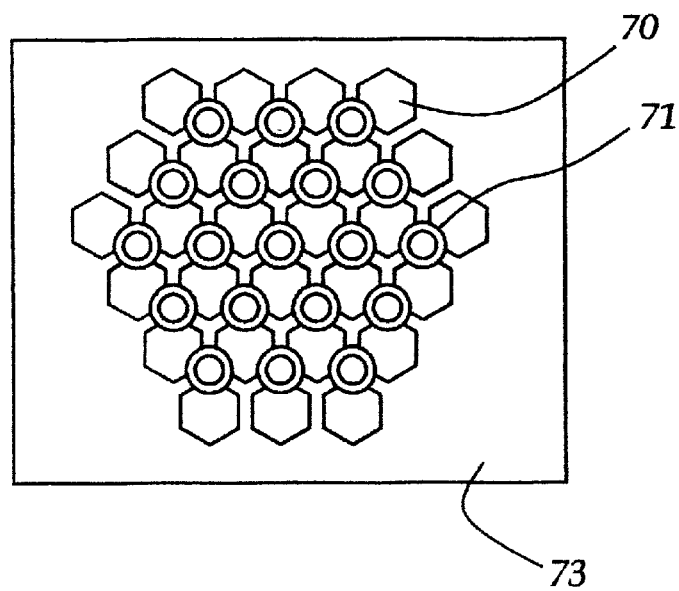
FIG. 4B is a plan view of an alternate embodiment of the transducer with the actuators and the rods organized along a triangulated grid instead of a square grid.

FIG. 4B shows an alternate embodiment of the disclosed transducer with its rods 71 and actuators 70 of a hexagonal cross-section shape organized according to a triangular grid. The actuators 75, shown as being prismoidal, are similarly held by a printed circuit board 76. This configuration may have certain advantages as it permits the actuators to be more closely packed than in a square grid. Yet other embodiments not shown in a figure may employ non-uniform grids. This is particularly useful to create areas in a transducer which have more resolution than others in an effort to reduce the total number of actuators.

Figure 5A:
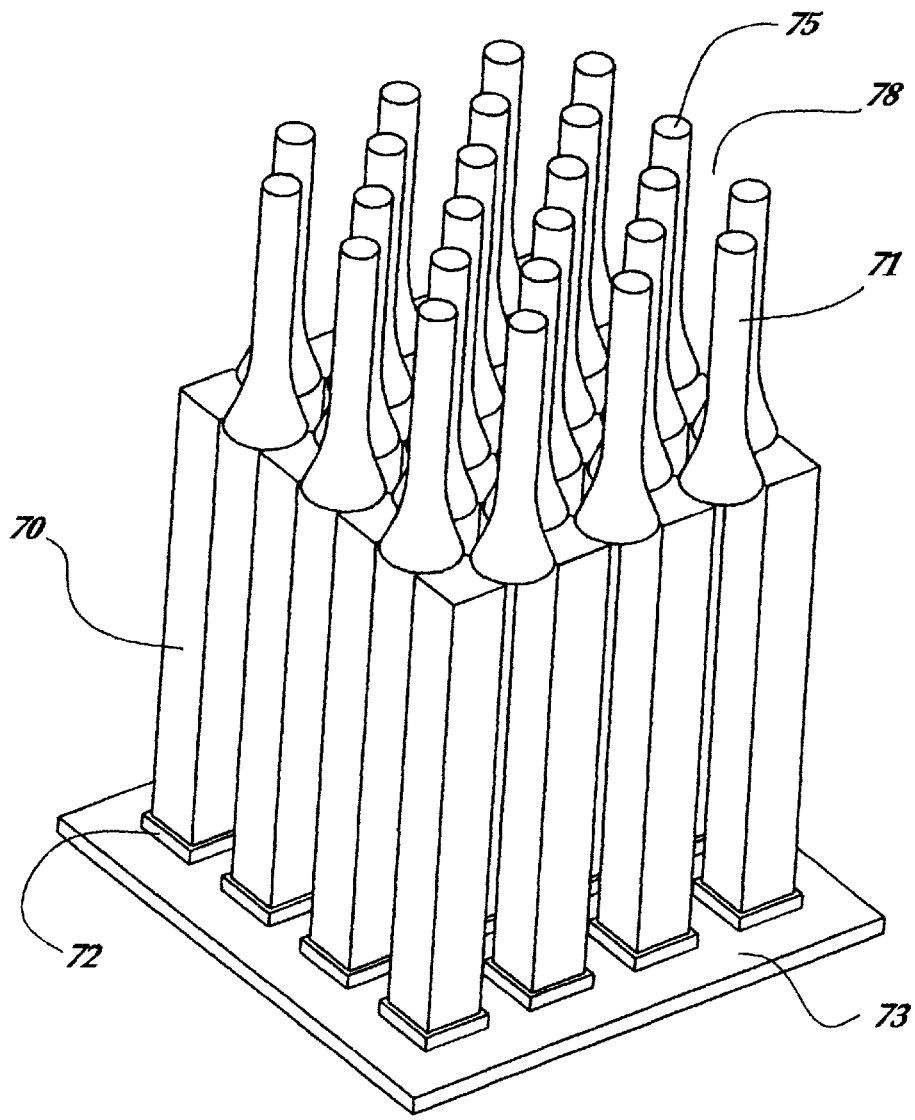
FIG. 5A is a pictorial, oblique view of the array of FIG. 4A.

The arrangement shown in FIG. 5A depicts an array of sixteen actuators 70 bonded to twenty-four rods 71 to create sixteen controllable gaps 78. Two dimensional compression/stretch patterns may be created at the tip-ends 75 by correspondingly activating each actuator 70 under computer control.

Figure 5B:
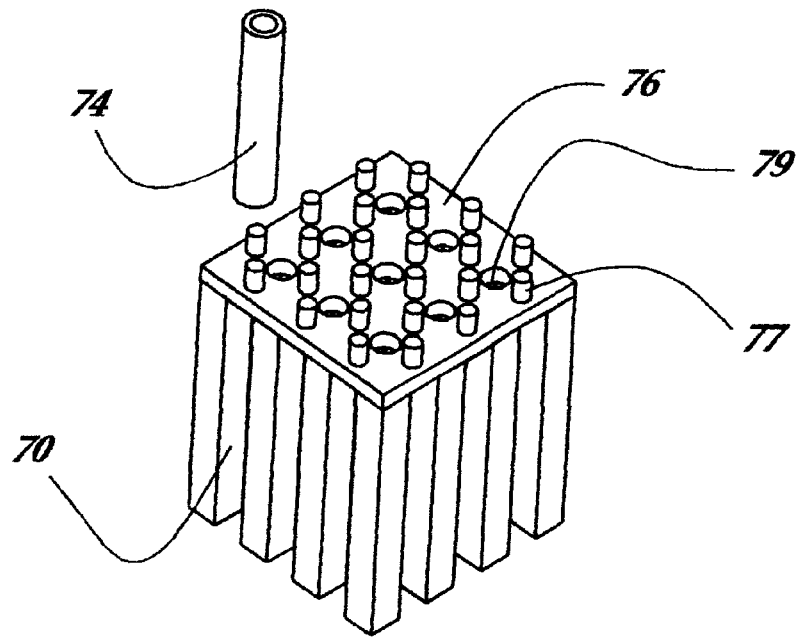
FIG. 5B is a pictorial view depicting an alternate mode of construction of a surface display array employing a flexible membrane and contactor mounting stumps.

FIG. 5B shows an alternate realization of the device of FIG. 5A using a flexible membrane 76 having stumps 77 on which tubular shafts 74 are inserted. Added membrane flexibility is provided by holes 79 which serve as relief to enable actuators 70 to more freely deform it locally.

Figure 5C:
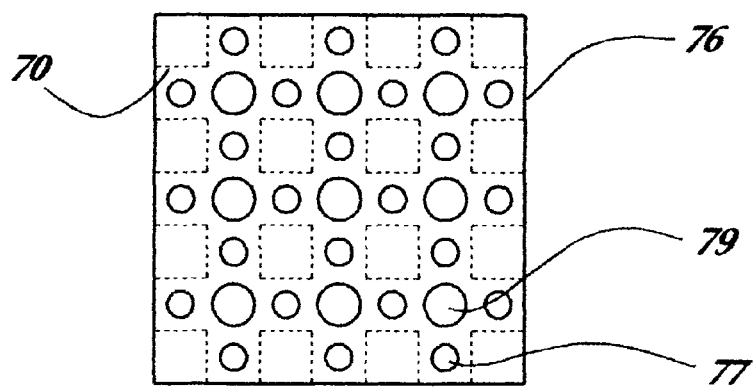
FIG. 5C is a plan view of the array of FIG. 5B which clarifies the geometrical relationships of the features of the membrane of FIG. 5B.

FIG. 5C shows more clearly the geometry of the membrane 76 with a top view. The stumps 77, holes 79, and actuators 70 form a repeating pattern.

Figure 5D:
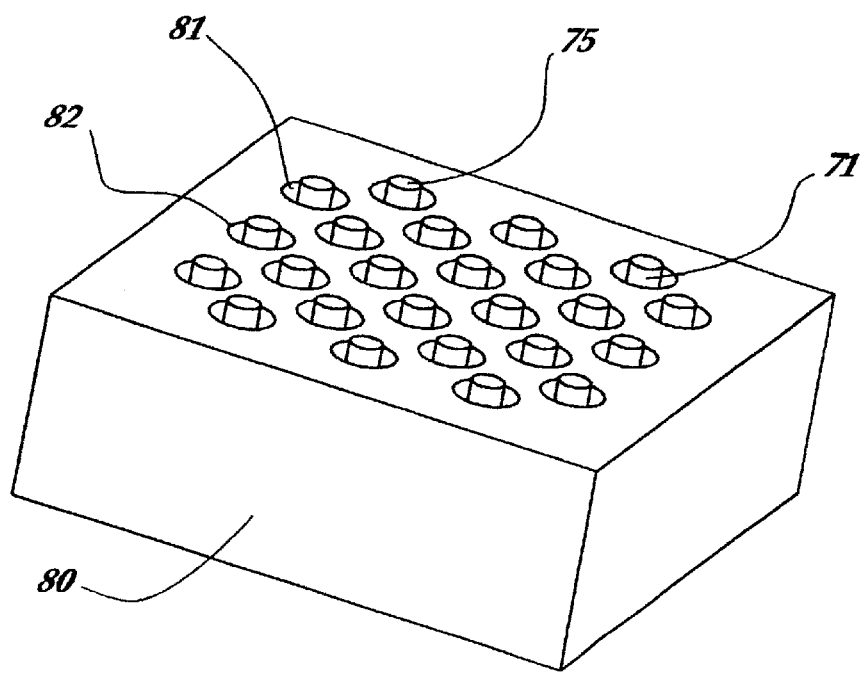
FIG. 5D is a pictorial view of the array of FIG. 5A contained in a protective box.

FIG. 5D shows the entire assembly housed in a mechanically and electrically protective enclosure 80. The object-contacting rod ends 75 are prevented from moving beyond an amount which could threaten their structural integrity by being passed through movement-limiting holes 82. Similarly, the space left vacant in the gap within each hole 82 may be partially filled with an elastomeric material, as depicted in FIGS. 2B or 3B, which permits the movement of the rods 71 but prevents foreign elements from entering the enclosure 80. In an alternate embodiment, the rod ends 75 may be flush with the upper surface of the protective enclosure 80 so that it does not present asperities. The device so constructed would be similarly effective in causing tactile sensations.

Figure 5E:
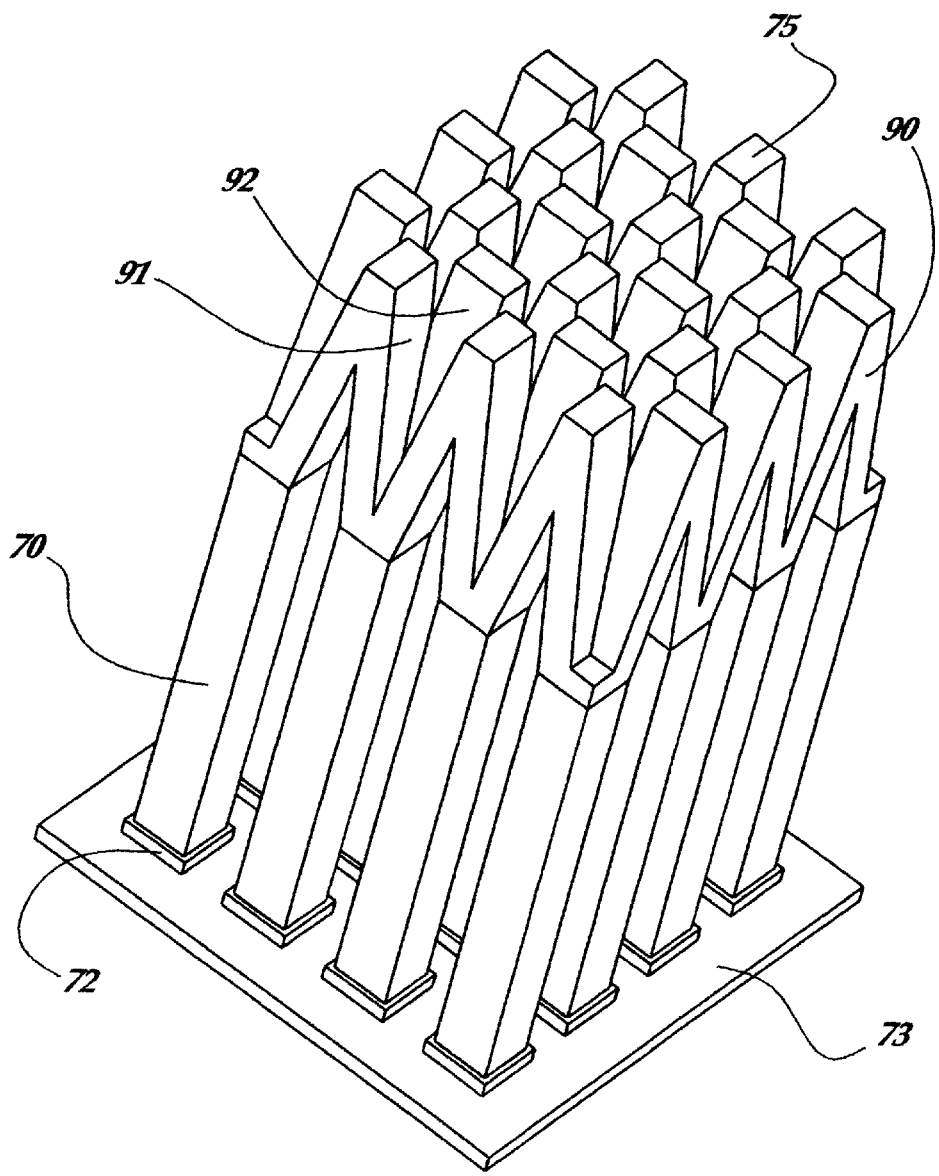
FIG. 5E is an alternate mode of construction of the contactor array wherein multiple contactors are, for portions or all of the array made of one single part.
Figure 5F:
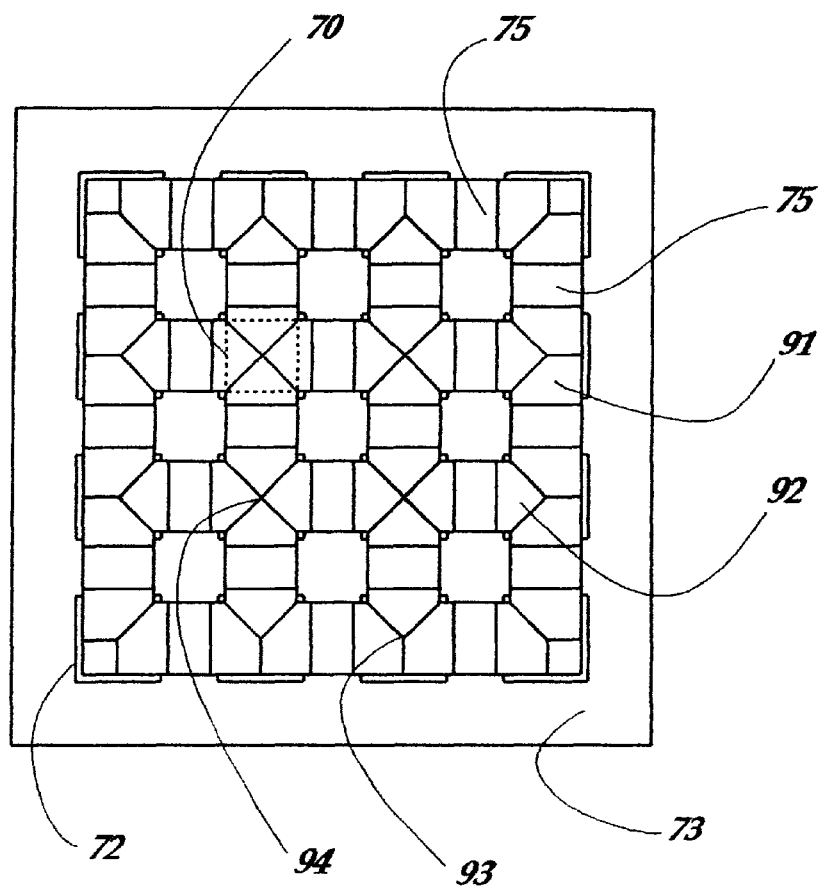
FIG. 5F is a top view of the device in FIG. 5E to clarify its geometry.

FIG. 5E shown an alternate embodiment of device 5A whereby a two dimensional contactor array 90 is formed out of a single piece of material having multiple legs 91 bonded on top of the actuators 70, which in turn are bonded to pads 72 of printed circuit board 73. The contactor upper surfaces 75 have the same geometric relationships with respect to the actuator 70, as upper surfaces 75 of the rods 50 of FIG. 5A have with respect to the similar actuators 52. Such a single-piece contactor array 90 can be conveniently manufactured of molded material. A convenient aspect ratio between its height and its pitch ranges from 5 to 10. A top view of the single piece contactor array 90 is shown on FIG. 5F wherein sloping surfaces 91 and 92 are represented in projection as well as upper skin contacting surfaces 75. The actuators 70, shown also in one sample dotted outline, are bonded to lower surfaces of the legs 91 centered at the intersections 93.

Figure 5G:
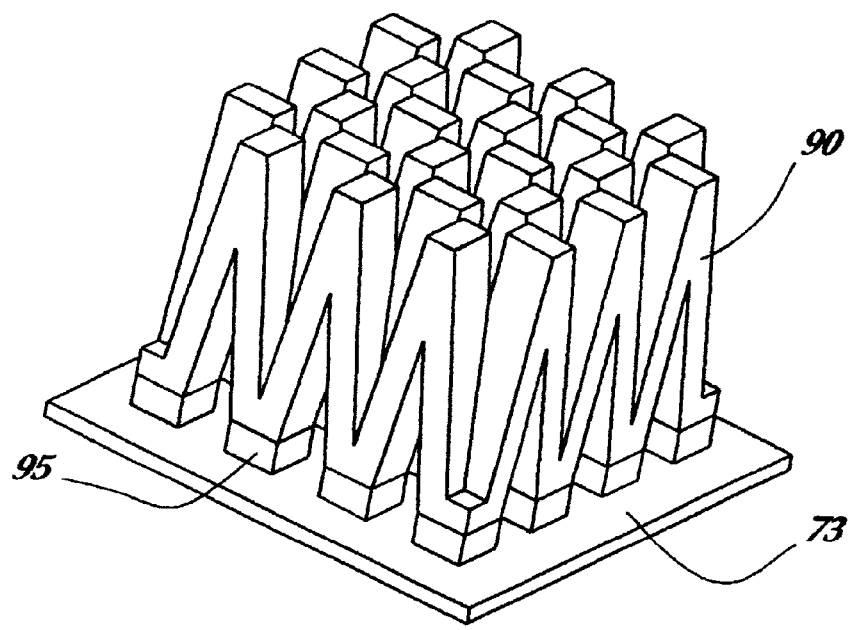
FIG. 5G is a pictorial view of a variant of FIG. 5E wherein the transducers are sensors which are reduced in height.

FIG. 5G shows an application of the invention as a tactually responsive sensor. Pressure sensors 95 sandwiched between the contactor array 90 and the printed circuit board 73 are shown on FIG. 5G with a much lower form factor than the corresponding actuators 70. This is because there are many techniques for fabricating integrated pressure sensors 95 that are compact in height, including but not limited to force sensitive resistors (FSR), polymeric piezo-electric film, for example, one made of Polyvinylidene Fluoride (PVFC), and other techniques.

Figure 5H:
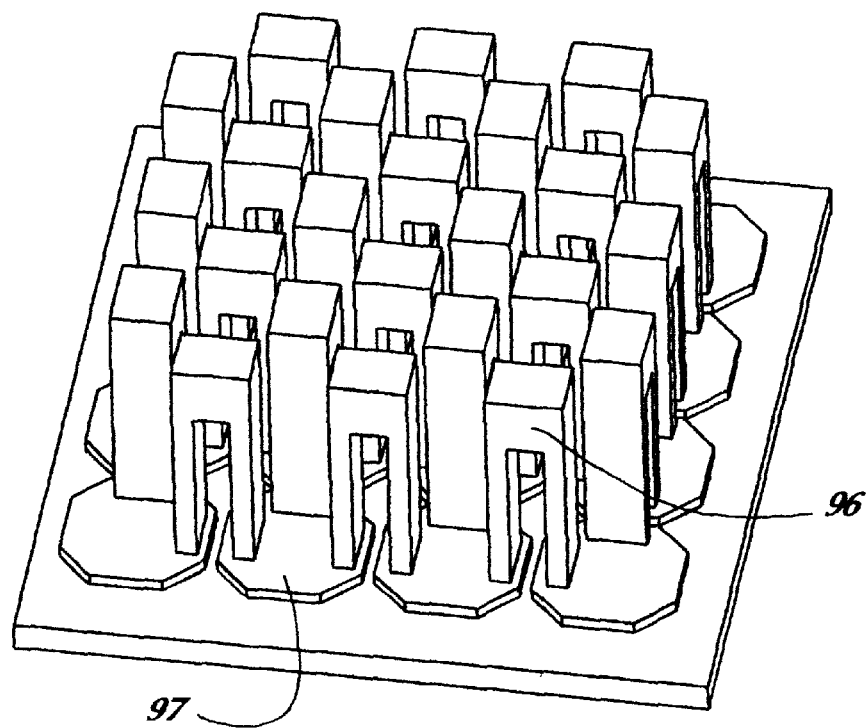
FIG. 5H is an alternate embodiment of the device of FIG. 5A that employs actuators shaped to also serve as contactors in providing a tactile display.
Figure 5I:
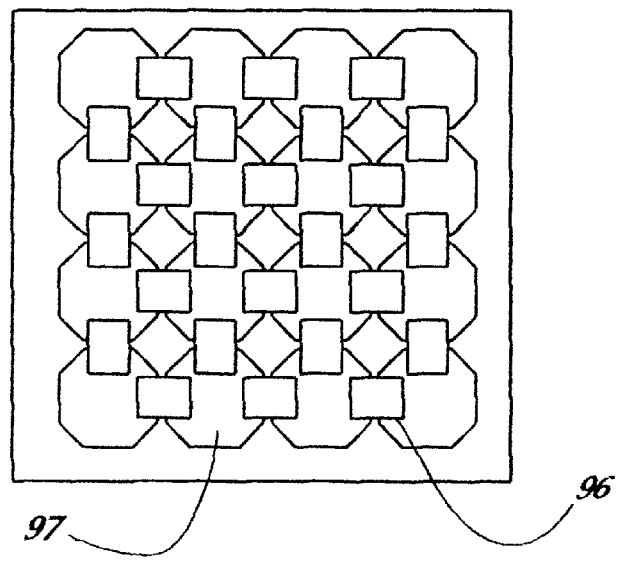
FIG. 5I is a top view of the device in FIG. 5H to clarify its geometry.

In FIGS. 5H and 5I another embodiment of the invention is described which addresses the need to diminish the fabrication cost and complexity in such devices. In FIG. 5H a two dimensional surface display or sensing device is shown using a set of actuators or sensors 96 which have been partially split in the middle thereby having the configuration of a tall arch. Four of such actuators/sensors share common bonding pads 97 at the bottom, in the repeating portion of the array, with three pads 97 being shared at the edges and two at the corners. FIG. 5I clarifies the geometrical relationships between the actuators/sensors 96 and the pads 97.

When a voltage difference is applied to two neighbouring pads 97 one leg of a straddling actuator 96 will stretch and the other will contract. As a tactile display, the operation of the embodiment of FIG. 5H is identical in principle to that of FIG. 5A, yet, it uses much fewer parts in exchange for more specialized actuators. This embodiment is also suited to the complementary application of serving as a tactile sensor.

Most actuating techniques are reversible since they are based on transducing phenomena. For example, electromagnetic transducers create torque when current is driven through them but create voltage in response to velocity; shape memory alloys change their stress-strain properties when their temperature is changed but their resistance is changed when the material is strained; and piezoelectric materials change their stress-strain properties when an electric field is applied, but create electric charges when they are strained. This principle applies to the disclosed device.

The same devices as described above can, for the most part, be made to respond to some degree to mechanical signals applied to their exposed contacting field, acting as tactually-responsive sensors. Because of their construction, such devices can in many cases respond to an applied pressure field in respect of both its normal and tangential components. External processing can then be used to extract features of the pressure field. This makes the devices of the invention particularly suited for use as dual-function transducers, e.g. as sensors and as stimulators, in hand controllers.

Applications of this ability are multiple. Employed in the field of automation, the device can be used as a tactile sensing array, used for example in the jaws of a robotic gripper to determine simultaneously the stress applied to a gripped object, it's location between the jaws, as well as external forces applied to the object as in part assembly operation.

Employed in the field of computer input devices, the disclosed invention may be used in the form of a tactually responsive pad to determine the character of the contact of a user's finger pushing on the pad. For example, the centroid of the force field can be computed to determine the location of the contact, a summation over that field can be computed to determine the intensity of the contact, and a gradient over that field can be computed to determine the tangential component of the finger contact force.

An example of the manner in which the invention may be applied is provided by remote television control units. These units operate on batteries and typically include a array of buttons which a user may learn to use efficiently by tactile exploration. The invention can be used to replace a complete array of buttons by a single tactile stimulator coupled with one single motion specification device. The motion specification device is used by the user to displace a cursor in a visible or invisible space while the user is informed by the tactile display of movements of that cursor and of its location in the space. The information may be conveyed by certain tactile patterns associated with movement and other tactile pattern associated with location. The fact that the actual displacements occurring within the tactile stimulator may be minute dimension makes for very low power requirements.

Employed as part of an improved computer or appliance data input device, such as a hand-held remote control unit or portable telephone, the invention can provide controlled, tactile stimulation to facilitate the positioning of a cursor in a space, even in the absence of visual or audio feedback. The invention, because of its potential miniature size and modest power consumption is particularly useful for the enhancement of computer games, portable computing devices, cameras, inter alia. In the medical field, the invention can be used in a remote palpation device enabling a doctor to use touch to diagnose a patient at distance. It can be used to improve minimally invasive surgical instruments (laparoscopic instruments, canulae, endoscopes, catheters, etc.), to create or recreate tactile sensations not provided by their use. The invention can also serve in interpreting data which is normally accessible visually, as in the inspection and manipulation of complex medical images, inspecting and manipulating computer aided design models.

Another example is provided by an improvement for a minimally invasive surgical instrument. Many of these instruments incorporate a gun-like handle which permits simultaneous manipulation of the instrument and operation of a closing action with the index finger. The trigger-like lever on which the index finger acts could be equipped with an array display, in a line or over a surface, to inform the surgeon of the contact being made by the acting end of the instrument on the organ to be operated on. This contact can be sensed by means of tactile sensing transducers located at the acting end of the instrument. Other parts of the handle could be equipped with tactile displays to convey tactile signals to other fingers or parts of the hand.

As the device is a reversible transducer, appropriate electronics, for example based on rapid time multiplexing, can be employed so that bi-directional tactile information is relayed to and from a user and a computer. In such configuration, a most common operation is to move a cursor on a screen. This can be accomplished by causing the position or velocity of the cursor to depend on finger location, pressure applied and/or tangential force components, while at the same time, the computer can relay tactually to the user such events as the motion of the cursor in traversing or following boundaries, traversing regions, or encountering other digital objects stored in the computer, whether these are visible or not.

As an additional field of application, for example in medicine, the disclosed invention may be applied to enable a doctor to palpate a patient at distance since it can act as a tactile sensor and a display. In a particularly simple scenario, the patient simply follows the directives of the doctor over a telephone to run the device at the appropriate parts of her or his anatomy, while the tactile signals are transmitted over the telephone line to be experienced by the doctor.

Still in the field of medicine, the disclosed invention may be applied to enhance tactile sensations derived by palpation. In this application faint tactile sensations can be either employed or processed by enhancing filters, such as contrast enhancing filters, to make the doctor sensitive to faint tactually detectable symptoms such as tumors or cysts too small or too deep to be detected without assistance. Similarly, sensations derived from the flow of fluids in vessels and cavities can be amplified and processed to provide an enhanced presentation to a doctor.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

What is claimed is:

1. A tactile transducer comprising at least one pair of adjacent contactors, each contactor having a pair of skin engaging contacting tips each separated laterally by a gap from the adjacent contacting tip to permit both of said tips to be engaged with the skin of a single human finger without slippage, each of said contactors of said contactor pair being coupled to transducer means to effect or sense relative lateral displacement of said contactors and associated variation of the lateral gap distance between each of said contacting tips.

2. A transducer comprising a linear array of transducers wherein multiple transducers as in claim 1 define a sequence of gap distances between consecutive contactor tips, said contactor pairs being coupled to a multiple number of transducer means to effect or sense the variations in the inter-tip gap distances in said sequence of gap distances.

3. A transducer as in claim 2 wherein adjacent contactors are coupled to individual, shared transducer means.

4. A transducer having the form of a plurality of linear transducer arrays as in claim 2 defining an area array comprising gap areas, each gap area being surrounded by contactor tips, said contactors being coupled to said transducer means to effect or sense variations of gap areas.

5. A transducer comprising three interspersed sets of linear transducer arrays as in claim 2 defining an array of gap areas surrounded by triplets of contactor tips carried by respective contactors, each triplet of contactors being coupled to transducer means to effect or sense variations of gap areas.

6. A transducer as in claim 1, 2, 3, 4, or 5 wherein the contactors are mounted to associated transducer means so as to mechanically amplify the effect of the lateral displacement of the contactor tips on the transducer means.

7. A transducer as in claim 1, 2, 3, 4, or 5 wherein the gap, the gap distances, or the gap areas are occupied by flexible, resilient, elastic material.

8. A transducer as in any one of claims 1, 2, 3, 4 or 5 in combination with:
   a) a processor in communication with the transducer means for determining data indicative of a contact sensed by the transducer means through contactor tips; and,
   b) an output means attached to the processor for providing an output characterized by such contact.

9. A transducer as in claims 1, 2, 3, 4 or 5 in combination with:
   a source of data indicative of a tactile display to be presented by said transducer and processor means for delivering to the transducer means signals to effect relative displacement of said contactors whereby a tactile display is provided by said one or more transducers.

10. A transducer as in any one of clams 1, 2, 3, 4 or 5 wherein said transducer effects lateral displacement of said contactors.

11. A transducer as in any one of claims 1, 2, 3, 4 or 5 wherein said transducer senses lateral displacement of said contactors.

12. A method of creating a tactile display across a plurality of contactors, each contactor having a respective skin engaging contactor tip separated from adjacent contactor tips by lateral gaps that permit a human finger to contact and be engaged with at least adjacent tips simultaneously, said contactors being actuable by actuation means, comprising operating the actuation means to cause the contactors to be laterally displaced in relation to one another, whereby, upon placing a sensate portion of skin against said contactor tips, tactile sensations are being caused by varying the gap distance or the gap distances, or the gap areas between the contactor tips.

13. A method as in claim 12 wherein the contactor tips are actuable by shared actuation means.

14. A method as in claim 12 or 13 wherein said gaps are varied in size as a result of amplified transverse movements of the contactor tips in response to longitudinal movement of the actuation means.

* * * * *